3,225,095
N-ARYL-SUBSTITUTED-PROPAN-(1)-ONES AND -OLS OF ARYLAMINOALKANOLS AND SALTS THEREOF

Kurt Thiele, Frankfurt am Main, Germany, assignor to Deutsche Gold- und Silber-Scheideanstalt vormals Roessler, Frankfurt am Main, Germany
No Drawing. Filed Mar. 28, 1963, Ser. No. 268,579
Claims priority, application Germany, Mar. 31, 1962, D 38,551; May 9, 1962, D 38,868; July 27, 1962, D 39,477; Jan. 17, 1963, D 40,704, D 40,705
6 Claims. (Cl. 260—570.5)

The present invention relates to novel araliphatic amines of the following formula:

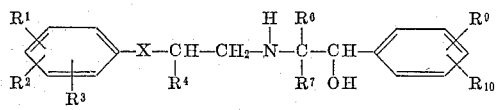

wherein
X is —CO— or —CH(OH)—;
Each of $R^1$, $R^2$ and $R^3$ is —H, —OH, —Cl, —OCH$_3$ or —NO$_2$;
$R^4$ is —H, —CH$_3$ or —C$_2$H$_5$;
Each of $R^6$ and $R^7$ is —H or —CH$_3$;
and
Each of $R^9$ and $R^{10}$ is —H, —Cl, —CH$_3$ or —OCH$_3$;

and their acid addition salts and quaternary ammonium compounds. The compounds according to the invention have useful pharmaceutical properties especially for heart and circulation conditions. They are particularly suited for improvement of the heart function.

For sake of simplicity in the following general description of the process for the production of the novel compounds of the invention the radial

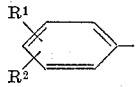

appearing at the left end of the structural formula given for such compounds will be designated as Ph$^1$— and the radical

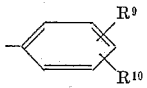

appearing at the right end of such structural formula will be designated as —Ph$^2$.

The compounds according to the invention can, for example, be produced by reacting a compound of the formula Ph$^1$—CO—Alk$^1$ with a compound of the formula

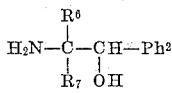

together with formaldehyde or a formaldehyde yielding substance. Preferably such reaction is carried out at raised temperatures in the presence of a solvent. The Alk$^1$ group in the formula Ph$^1$—CO—Alk$^1$ represents the alkyl group

It also is possible to react a compound of the formula

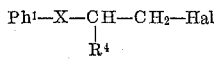

wherein Hal is a halogen atom, preferably chlorine or bromine, with a compound of the formula

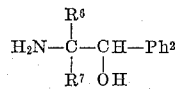

Preferably such reaction is carried out at raised temperatures in the presence of a solvent and a basically reacting substance such as alkali metal alcoholate, sodium amide, potassium carbonate, a tertiary amine or the like.

Similarly the compounds can also be prepared by reacting a compound of the formula

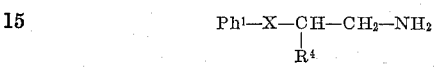

with a compound of the formula

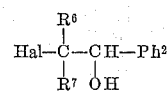

In the event the compound produced is one wherein —X— is —CO— it is possible to convert such compound or its salts into a compound wherein —X— is —CH(OH)— by catalytic hydrogenation, that is, treatment with hydrogen in the presence of a catalyst, or other reductions known per se using, for example, sodium or lithium borohydride, alkali metal alcoholates, alkaline earth metal alcoholates or aluminum alcoholates as the reducing agents.

In addition, compounds according to the invention wherein X=—CO— can be prepared by reacting a compound of the formula Ph$^1$Me, wherein Me is a lithium, sodium or potassium atom, with a compound of the formula

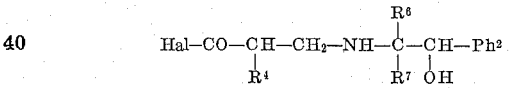

wherein Hal is a halogen atom, preferably chlorine or bromine.

Compounds according to the invention wherein X=—CO— also can be prepared by reacting a compound of the formula Ph$^1$MgHal with a compound of the formula

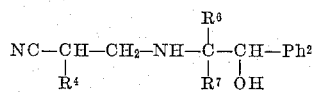

In the presence of water the amino ketones according to the invention are produced.

It also is possible to produce the compounds according to the invention by reductive condensation of a compound of the formula

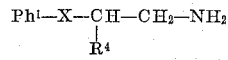

with a compound of the formula

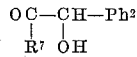

The bases which are produced which contain optically active carbon atoms and as a rule occur as racemates can be reacted with an optically active acid and be resolved into the optically active isomers by fractional precipitation or crystallization.

In many instances it also is possible to use optically active isomers of the following formulae as starting materials:

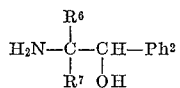

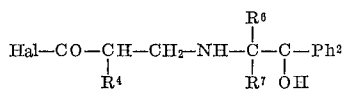

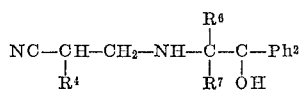

or

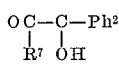

Furthermore the novel bases according to the invention can be converted to their acid addition salts with acids having pharmaceutically acceptable anions such as HCl, $H_2SO_4$, $H_3PO_4$, citric acid, lactic acid, succinic acid, maleic acid and the like and also to the quaternary ammonium compounds with pharmaceutically acceptable quaternizing agents.

The following examples will serve to illustrate the invention with reference to a number of specific embodiments thereof.

*Example 1*

150 g. of acetophenone (1.33 mol), 20 g. of paraformaldehyde and 66 g. of l-norephedrine hydrochloride (0.35 mol) were refluxed in 110 cc. of ethanol. The main quantity of the ethanol was then evaporated under vacuum and acetone-ether added to the resulting solution. The resulting crystals were filtered off and recrystallized from isopropanol. 3-[1-phenyl-1-hydroxy-propyl - (2)-amino]-1-phenyl-propanone-(1) · HCl with a melting point of 196–197° C. was obtained. The formula thereof is:

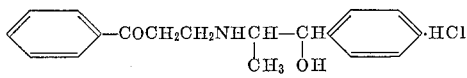

Analogously, 3-[1 - phenyl-1 - hydroxy - propyl - (2)-amino]-1 - (p-chlorophenyl)-propanone - (1) · HCl of a melting point of 205–207° C. after recrystallization from methanol was obtained from p-chloroacetophenone, paraformaldehyde and l-norephedrine · HCl.

*Example 2*

45 g. of m-methoxy acetophenone, 8 g. of paraformaldehyde and 30.2 g. of l-norephedrine were mixed with about 135 cc. of isopropanol HCl solution to provide a pH of 4 and the mixture refluxed for 4 hours. The reaction mixture was cooled and the crystals filtered off on a suction filter. 3-[1-phenyl-1-hydroxy-propyl-(2)-amino]-1-(m - methoxy-phenyl)-propanone-(1) · HCl was obtained which after recrystallization from methanol had a melting point of 190–193° C.

Analogously, 3-[1-phenyl-1-hydroxy-propyl-2-amino]-1-phenyl-2-methyl-propanone-(1) · HCl of a melting point of 191–193° C. was obtained from propiophenone, paraformaldehyde and l-norephedrine.

*Example 3*

A mixture of 16.8 g. of β-chloropropiophenone, 15.1 g. of l-norephedrine, 150 cc. of isopropanol and 21 g. of $K_2CO_3$ was refluxed for 3 hours and filtered hot. 3-[1-phenyl - 1 - hydroxy-propyl-(2)-amino] - 1 - phenyl-propanone-(1) was recovered from the filtrate, which base after recrystallization from isopropanol had a melting point of 138–140° C. The hydrochloride thereof produced by treatment of the free base with isopropanolic HCl had a melting point of 195° C.

*Example 4*

A mixture of 27.2 g. of p-hydroxy-acetophenone, 6 g. of paraformaldehyde, 20.1 g. of l-norephedrine · HCl and 100 cc. of ethanol was refluxed for 2½ hours. Upon processing of the reaction mixture as in Example 3, N-[3-phenyl - 3 - hydroxy-propyl-(2)] - β - amino-(p-hydroxy-propiophenone) · HCl was isolated. After recrystallization from methanol the compound had a melting point of 210° C.

The formula thereof is:

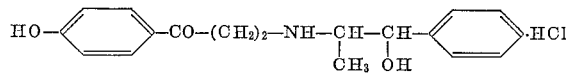

*Example 5*

Analogously to Example 2, N-[3-phenyl-3-hydroxy-propyl - (2)] - β - amino-(3,4,5 - trimethoxy - propiophenone) · HCl was obtained from 3,4,5-trimethoxy-acetophenone, paraformaldehyde and l-norephedrine. Upon recrystallization from ethanol the compound had a melting point of 175–177° C.

Analogously:

(1) N - [3 - phenyl - 3 - hydroxy - phenyl - (2)] - α-methyl-β-amino(p-methoxy-propiophenone) · CHl was obtained from 4-methoxy-propiophenone, paraformaldehyde and l-norephedrine. Upon recrystallization from methanol it had a melting point of 206–209° C.

(2) N - [3 - phenyl - 3 - hydroxy - propyl - (2)] - β-amino-2-methoxy-propiophenone · HCl was obtained from 2-methoxy-acetophenone, paraformaldehyde and l-norephedrine. Upon recrystallization from ethanol it had a melting point of 163–165° C.

(3) N - [3 - phenyl - 3 - hydroxy - propyl - (2)] - β-amino-4-methoxy-propiophenone · HCl was obtained from 4-methoxy-acetophenone, paraformaldehyde and l-norephedrine. Upon recrystallization from methanol it had a melting point of 199–201° C.

(4) N - [3 - phenyl - 3 - hydroxy - propyl - (2)] - β-amino-2-hydroxy-propiophenone-(1) · HCl was obtained from o-hydroxy-acetophenone, paraformaldehyde, and l-norephedrine. Upon recrystallization from methanol it had a melting point of 214–217° C.

(5) N - [3 - phenyl - 3 - hydroxy - propyl - (2)] - β-amino-2-hydroxy-5-methyl-propiophenone · HCl was obtained from 2-hydroxy-5-methyl-acetophenone, paraformaldehyde and l-norephedrine. Upon recrystallization from methanol it had a melting point of 219–222° C.

(6) N - [3 - phenyl - 3 - hydroxy - propyl - (2)] - β-amino-2-hydroxy-4-methoxy-propiophenone · HCl was obtained from 2-hydroxy-4-methoxy-acetophenone, paraformaldehyde and l-norephedrine. Upon recrystallization from methanol it had a melting point of 212–213° C.

*Example 6*

A mixture of 45 g. of 4-hydroxy-propiophenone, 8 g. of paraformaldehyde and 30.2 g. of l-norephedrine neutralized with 80 cc. of isopropanolic HCl was refluxed for 4 hours. Then after cooling 200 cc. of acetone were added to the reaction mixture. The precipitated N-[3-phenyl-3-hydroxy - propyl - (2)] - α - methyl - β - amino - (p - hydroxy-propiophenone) · HCl after recrystallization from methanol had a melting point of 204–206° C.

*Example 7*

A mixture of 39.4 g. of p-hydroxy-butyrophenone, 6.6 g. of paraformaldehyde and 30.2 g. of l-norephedrine whose pH was adjusted to 6 with 115 g. of isopropanolic HCl was refluxed for 4½ hours. After cooling 40 cc. of acetone was added. The precipitated N-[3-phenyl-3-hydroxy-propyl - (2)] - α - ethyl - β - amino - 4 - hydroxy - propiophenone · HCl after recrystallization from methanol had a melting point of 204–206° C.

Example 8

A mixture of 3-nitroacetophenone, 4.0 g. paraformaldehyde and 15 g. of 1-norephedrine adjusted to a pH of 4 with 95 cc. of isopropanolic HCl was refluxed for 4 hours. Upon cooling the N-[3-phenyl-3-hydroxy-propyl-(2)]-β-amino-3-nitropropiophenone·HCl precipitated from the reaction mixture. Its melting point was 223–225° C.

Example 9

4 g. of NaBH₄ dissolved in 30 cc. of water was added dropwise to a mixture of 25 g. of N-[3-phenyl-3-hydroxy-propyl-(2)]-β-amino-3-nitropropiophenone in 250 cc. of methanol at 25° C. After such addition the reaction mixture was stirred a further 2 hours. The solvent was evaporated off and the residue taken up in benzene and shaken out with dilute aqueous NaOH. The benzene solution was dried and the benzene distilled off. The residue was converted to the hydrochloride and recrystallized three times from methanol. The N-[3-phenyl-3-hydroxy-propyl-(2)]-3-(3-nitrophenyl) - 3 - hydroxy-propylamine·HCl had a melting point of 217° C.

Example 10

25 g. of 3-[1-phenyl-1-hydroxy-propyl-(2)-amino]-1-phenyl-propanone-(1)·HCl (Example 2) were dissolved in 400 cc. of methanol and hydrogenated in the presence of 4 g. Pd/BaSO₄ (5% Pd) as catalyst at 60° C. under a hydrogen pressure of 10 atmospheres. The reaction mixture was filtered and the filtrate evaporated to dryness. The residue was taken up in 20 cc. of isopropanol and 130 cc. of ether-ligroin added thereto. The precipitated 3-[1-phenyl-1-hydroxy-propyl-(2)-amino]-1-phenyl-propanol-(1)·HCl after recrystallization from isopropanol had a melting point of 176–178° C.

Analogously:

(1) 3-[1-phenyl-1-hydroxy-propyl-(2)-amino]-1-phenyl-2-methyl-propanol-(1) was obtained from 3-[1-phenyl-1-hydroxy-propyl-(2)-amino] - 1-phenyl-2-methyl-propanone-(1)·HCl (Example 2). After recrystallizing twice from methanol it had a melting point of 239° C.

(2) 3-[1-phenyl-1-hydroxy-propyl - (2) - amino]-1-m-methoxyphenyl)-propanol-(1)·HCl was obtained from 3-[1-phenyl-1-hydroxy-propyl-(2)-amino]-1-(m-methoxyphenyl)-propanone-(1)·HCl. After recrystallizing twice from isopropanol-ether it had a melting point of 155–158° C.

Example 11

16 g. (0.05 mol) of 3-[1-phenyl-1-hydroxypropyl-(2)-amino]-1-phenyl-propanone-(1)·HCl (Example 1) were dissolved in 100 cc. of methanol. Then 2.9 g. of NaBH₄ (1.5 x 0.05 mol) dissolved in 25 cc. of water were added thereto dropwise at 25° C. and the mixture subsequently stirred for a further hour. The solution was then concentrated and taken up in 100 cc. of water and 40 cc. NaOH 40% added thereto. The mixture was then extracted with benzene and the benzene extract dried with K₂CO₃ and evaporated to dryness. The residue was dissolved in 25 cc. of isopropanol and neutralized with isopropanolic HCl. The precipitate salt, 3-[1-phenyl-1-hydroxy-propyl-(2)-amino]-1-phenyl-propanol - (1)·HCl after recrystallization from isopropanol-ligroin had a melting point of 179° C.

Example 12

28.5 g. (0.1 mol) 3-[1-phenyl-1-hydroxy-propyl-(2)-amino]-1-phenyl-propanone-(1) base were dissolved in 150 cc. of isopropanol and heated under a stream of nitrogen while stirring with 20.4 g. (0.1 mol) of aluminum isopropylate for 8 hours at 80° C. The solution was then evaporated to dryness and the residue dissolved in 80 cc. of 20% H₂SO₄ and then rendered alkaline with NaOH and extracted with benzene extract. The benzene extract was processed as in Example 11 to yield the same product.

Example 13

36 g. of acetophenone, 8 g. of paraformaldehyde and 27.4 g. of phenyl hydroxy ethyl amine having its pH adjusted to 5 with 115 cc. of isopropanolic HCl were refluxed for 4½ hours. The solvent was driven off under vacuum and the residue dissolved in 80 cc. of acetone and 60 cc. ether added thereto. The precipitated N-(2-phenyl - 2 - hydroxy-ethyl)-β-amino-propiophenone·HCl after recrystallization from isopropanol had a melting point of 161–163° C.

Example 14

28 g. of the product of Example 13 were dissolved in 500 cc. of methanol and hydrogenated at 10 atmospheres pressure at 60° C. in the presence of 3 g. Pd/BaSO₄ (5% Pd) as catalyst. The reaction mixture was then filtered and the solution evaporated to dryness. The residue, N-(2-phenyl-2-hydroxy-ethyl)-3-phenyl-3-hydroxy-propyl-amine·HCl, after recrystallization from isopropanol-ligroin had a melting point of 193° C.

I claim:

1. A compound of the formula

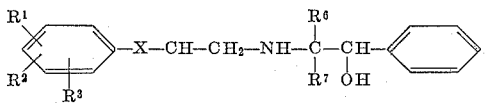

wherein X is a divalent radical selected from the group consisting of —CO— and —CH(OH)—, each of $R^1$, $R^2$ and $R^3$ is selected from the group consisting of —H, —OH, —Cl, —OCH₃ and —NO₂, $R^4$ is selected from the group consisting of —H, —CH₃ and —C₂H₅, each of $R^6$ and $R^7$ is selected from the group consisting of —H and —CH₃ and each of $R^9$ and $R^{10}$ is selected from the group consisting of —H, —Cl and —OCH₃.

2. 3-[1-phenyl-1-hydroxy-propyl-(2)-amino] - 1 - (m-methoxy-phenyl)-propanone-(1).

3. 3-[1-phenyl-1-hydroxy-propyl - (2) - amino]-1-phenyl-propanone-(1).

4. 3-[1-phenyl-1-hydroxy-propyl - (2) - amino]-1-phenyl-propanol-(1).

5. 3-[1 - phenyl - 1 - hydroxy-propyl-(2)-amino]-1-(m-methoxyphenyl)-propanol-(1).

6. N-(2-phenyl-2-hydroxy-ethyl) - 3 - phenyl - 3 - hydroxy-propylamine.

References Cited by the Examiner

UNITED STATES PATENTS

| | | | |
|---|---|---|---|
| 1,911,332 | 5/1933 | Warnat | 260—570 |
| 2,489,668 | 11/1949 | Plati et al. | 260—570 |
| 2,661,373 | 12/1953 | Kulz | 260—570 |
| 2,900,415 | 8/1959 | Biel | 260—570 |

OTHER REFERENCES

Fellows: "Proc. Soc. Exptl. Biol. Med.," vol. 65, pages 261–5 (1947).

Tsatsas: "Chemical Abstracts," vol. 49, pages 8856–7 (1955).

CHARLES B. PARKER, *Primary Examiner.*

IRVING MARCUS, *Examiner.*